United States Patent
Holden et al.

(10) Patent No.: US 8,490,377 B2
(45) Date of Patent: Jul. 23, 2013

(54) HIGH FLEX-LIFE ELECTRICAL CABLE ASSEMBLY

(75) Inventors: Chester David Holden, Tucson, AZ (US); Michael Philip McIntosh, Tuscon, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 12/773,844

(22) Filed: May 5, 2010

(65) Prior Publication Data

US 2011/0274524 A1    Nov. 10, 2011

(51) Int. Cl.
    *F16G 13/00*    (2006.01)
(52) U.S. Cl.
    USPC .......................................................... 59/78.1
(58) Field of Classification Search
    USPC ............................................. 59/78.1; 36/92.1
    See application file for complete search history.

(56) References Cited

U.S. PATENT DOCUMENTS

| | | | |
|---|---|---|---|
| 2,804,494 A | 4/1953 | Fenton | |
| 3,612,744 A | 10/1971 | Thomas | |
| 4,486,619 A | 12/1984 | Trine et al. | |
| 4,672,805 A * | 6/1987 | Moritz | 59/78.1 |
| 5,178,297 A * | 1/1993 | Harold | 220/612 |
| 5,343,989 A * | 9/1994 | Hu et al. | 191/12 R |
| 5,399,813 A | 3/1995 | McNeill et al. | |
| 5,468,159 A | 11/1995 | Brodsky et al. | |
| 5,767,442 A | 6/1998 | Eisenberg et al. | |
| 5,821,467 A | 10/1998 | O'Brien et al. | |
| 6,066,799 A | 5/2000 | Nugent | |
| 6,162,992 A | 12/2000 | Clark et al. | |
| 6,303,867 B1 * | 10/2001 | Clark et al. | 174/113 R |
| 6,916,062 B2 * | 7/2005 | Suzuki et al. | 296/155 |
| 7,098,405 B2 | 8/2006 | Glew | |
| 7,317,163 B2 | 1/2008 | Lique et al. | |
| 7,317,164 B2 | 1/2008 | Lique et al. | |
| 7,811,153 B1 * | 10/2010 | Blank et al. | 451/9 |
| 2003/0109171 A1 | 6/2003 | Morgan | |
| 2005/0139309 A1 * | 6/2005 | Savoie et al. | 156/99 |
| 2007/0183084 A1 * | 8/2007 | Coufal et al. | 360/92 |
| 2007/0187132 A1 | 8/2007 | Watt | |
| 2008/0017661 A1 * | 1/2008 | Hutchinson et al. | 221/211 |
| 2008/0251276 A1 | 10/2008 | Clark et al. | |

* cited by examiner

*Primary Examiner* — Saul Rodriguez
*Assistant Examiner* — Willie Berry, Jr.
(74) *Attorney, Agent, or Firm* — Nelson and Nelson; Daniel P. Nelson; Alexis V. Nelson (57) ABSTRACT

An apparatus is disclosed in one embodiment of the invention as including an accessor to physically transport tape cartridges in a tape library. A flexible cable assembly is connected to the accessor that enables the accessor to move relative to the tape library and enables one of power and communication signals to be transmitted to the accessor. The flexible cable assembly includes a flexible channel and multiple twisted wire pairs loosely routed through the flexible channel. The multiple twisted wire pairs independently and substantially freely move within the flexible channel. A corresponding method is also disclosed herein.

10 Claims, 9 Drawing Sheets

HIGH FLEX-LIFE ELECTRICAL CABLE ASSEMBLY

BACKGROUND

1. Field of the Invention

This invention relates to electrical cables, and more specifically to high flex-life electrical cables for transmitting high bandwidth signals.

2. Background of the Invention

A tape library is an automated data storage system used to store data on magnetic tape cartridges. A tape library typically includes tape drives for reading and writing information to magnetic tape cartridges, access ports for entering and removing cartridges from the tape library, and a moving robot (i.e., an accessor) to physically transport tape cartridges between storage cells, drives, and access ports. The robotics associated with the accessor enable the accessor to move in left and right directions (X-motion) and up and down directions (Y-motion). The accessor typically includes motors and controller cards that require power and the ability to communicate with a stationary library controller.

To transmit electrical power and data signals between a stationary library controller and a moving accessor, one option is to use a cable assembly comprising flat parallel conductors, such as is used in the IBM 3494 and 3584 tape libraries. Although effective, flat parallel conductors have limited signal bandwidth and noise immunity as a result of the flat straight conductors. Thus, if bandwidth requirements continue to increase, this technology will eventually reach its limit. Another option is to use moving contacts that slide on fixed conductors like those used in the Sun-STK SL8500 tape library. This solution has various drawbacks such as contact wear, noise generation, limited bandwidth, and the limited number of signals that can be transmitted using this approach. Yet another option is to use non-contact means for transmitted power and electrical signals such as by using inductive coupling or wireless communication. Although effective to eliminate wires, this solution may require addressing issues such as electromechanical complexity, power transmission efficiency, electromagnetic compatibility (EMC), and radio frequency interference (RFI). This solution may also require isolating the communication signal from other wireless systems for security purposes or to prevent interference.

In view of the foregoing, what is needed is a flexible cable assembly to efficiently transmit electrical power and data signals between a stationary library controller and a moving tape library accessor. Ideally, such a flexible cable assembly would provide high-bandwidth signal capability and high noise immunity. The flexible cable assembly would also ideally have a very high flex life.

SUMMARY

The invention has been developed in response to the present state of the art and, in particular, in response to the problems and needs in the art that have not yet been fully solved by currently available apparatus and methods. Accordingly, the invention has been developed to provide an electrical cable assembly to efficiently transmit electrical power and data signals between a stationary library controller and a moving tape library accessor. The features and advantages of the invention will become more fully apparent from the following description and appended claims, or may be learned by practice of the invention as set forth hereinafter.

Consistent with the foregoing, an apparatus is disclosed in one embodiment of the invention as including an accessor to physically transport tape cartridges in a tape library. A flexible cable assembly is connected to the accessor that enables the accessor to move relative to the tape library and enables one of power and communication signals to be transmitted to the accessor. The flexible cable assembly includes a flexible channel and multiple twisted wire pairs loosely routed through the flexible channel. The multiple twisted wire pairs independently and substantially freely move within the flexible channel.

A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
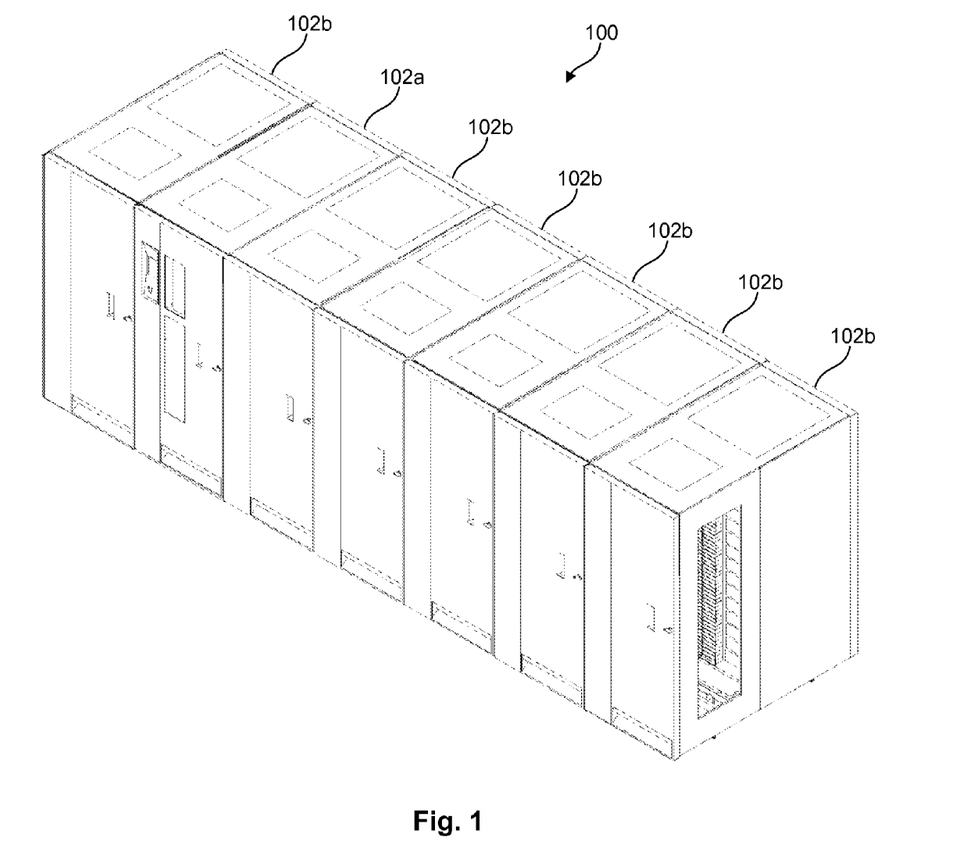
FIG. 1 is a perspective view of one embodiment of tape library that may utilize a high flex-life electrical cable assembly in accordance with the invention.

Referring to FIG. 1, one example of a tape library 100 that may utilize a high flex-life electrical cable assembly in accordance with the invention is illustrated. The illustrated tape library 100 is a modular tape library 100 that comprises one or more frames 102. These frames 102 may contain tape drives and storage slots for storing tape cartridges. In certain embodiments, the tape library 100 includes a base frame 102a (as further illustrated in FIG. 2) to which optional expansion frames 102b may be added. This allows expansion of the tape library 100 as data storage needs grow. The expansion frames 102b may provide additional library components such as storage slots, drives, import/export stations, accessors, operator panels, or the like, to the tape library 100. One non-limiting example of a tape library 100 having functionality similar to that illustrated in FIG. 1 is the IBM 3584 tape library. Nevertheless, the high flex-life electrical cable assembly disclosed herein is not limited to the illustrated tape library 100, but may be applicable to other tape libraries 100 manufactured by IBM or other vendors.

Figure 2:
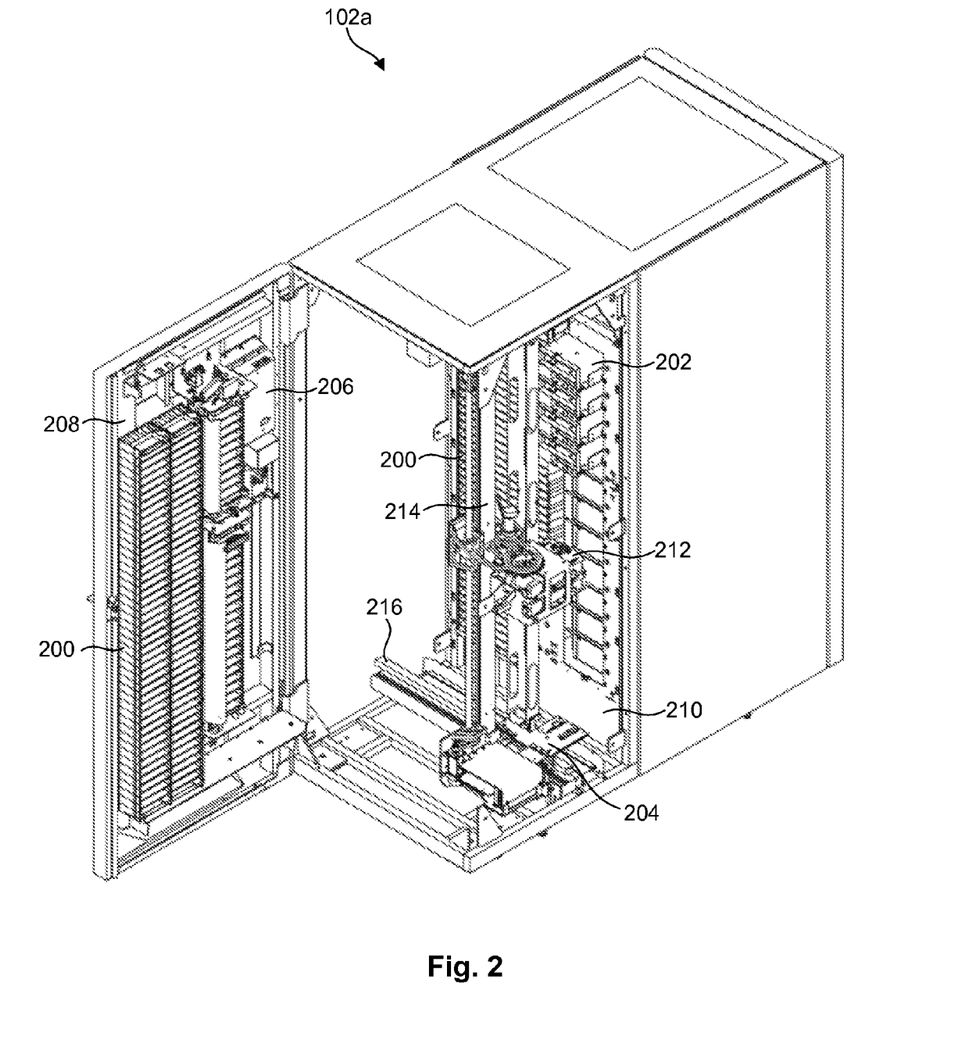
FIG. 2 is a perspective view of one embodiment of tape library base frame.

Referring to FIG. 2, one embodiment of a tape library base frame 102a is illustrated. The base frame 102a itself may function as a single-frame tape library 100. The base frame 102a may be adapted to access data on tape cartridges in response to commands from one or more external host systems (not shown). As shown, the base frame 102a includes storage slots 200 on a front wall 208 and rear wall 210 to store tape cartridges; one or more tape drives 202 to access data on the tape cartridges; and an accessor 204 to physically transport tape cartridges between the storage slots 200 and the tape drives 202. The base frame 102a may also optionally include an operator panel 206 or user interface to enable a user to interact with the tape library 100. The base frame 102a may further include import and export stations to allow tape cartridges to be inserted or removed from the tape library 100 without disrupting operations.

To enable the movement of tape cartridges between the storage slots 200 and the tape drives 202, the accessor 204 may include a gripper and pivot assembly 212 that moves up and down on an accessor mast 214. Similarly, the accessor 204 may travel in left and right directions along a track 216. This dual movement enables the gripper and pivot assembly 212 to move in both X and Y directions. This X-Y movement allows the gripper and pivot assembly 212 to transport tape cartridges between the storage slots 200 and the tape drives 202. In certain embodiments, the gripper and pivot assembly 212 includes a reading device, such as a bar code scanner, to read identifying information on each tape cartridge.

Figure 3:
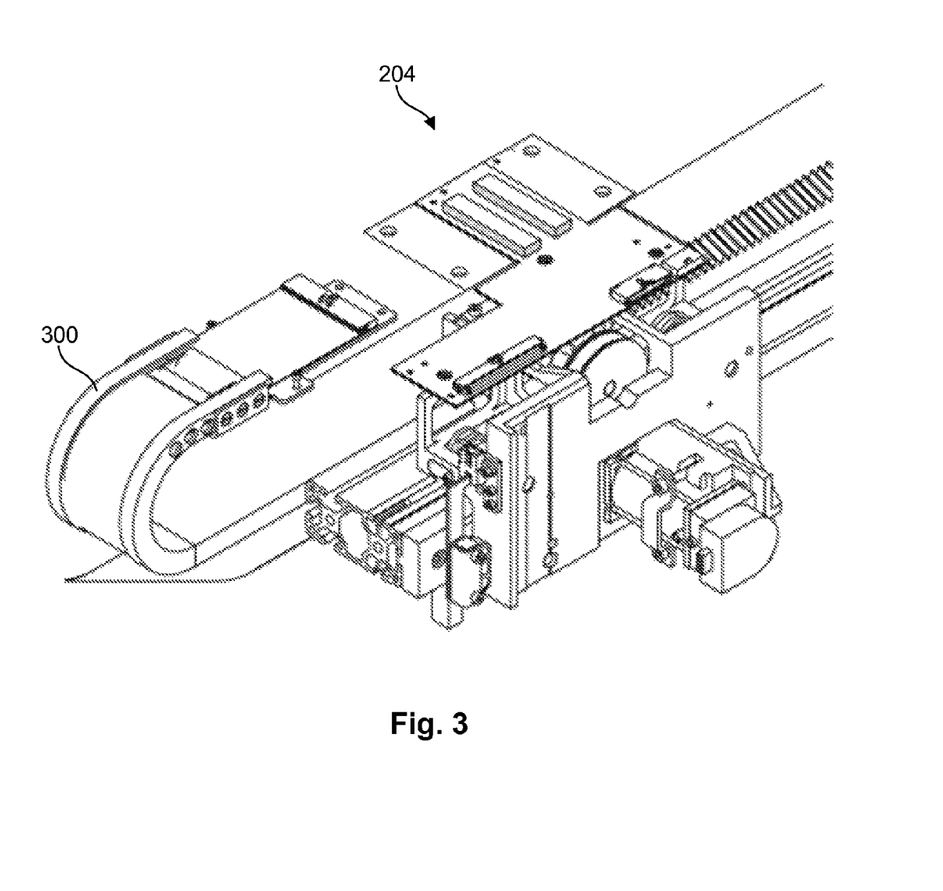
FIG. 3 is a perspective view of an electrical cable assembly that shows how it connects to the base of an accessor.
Figure 4:
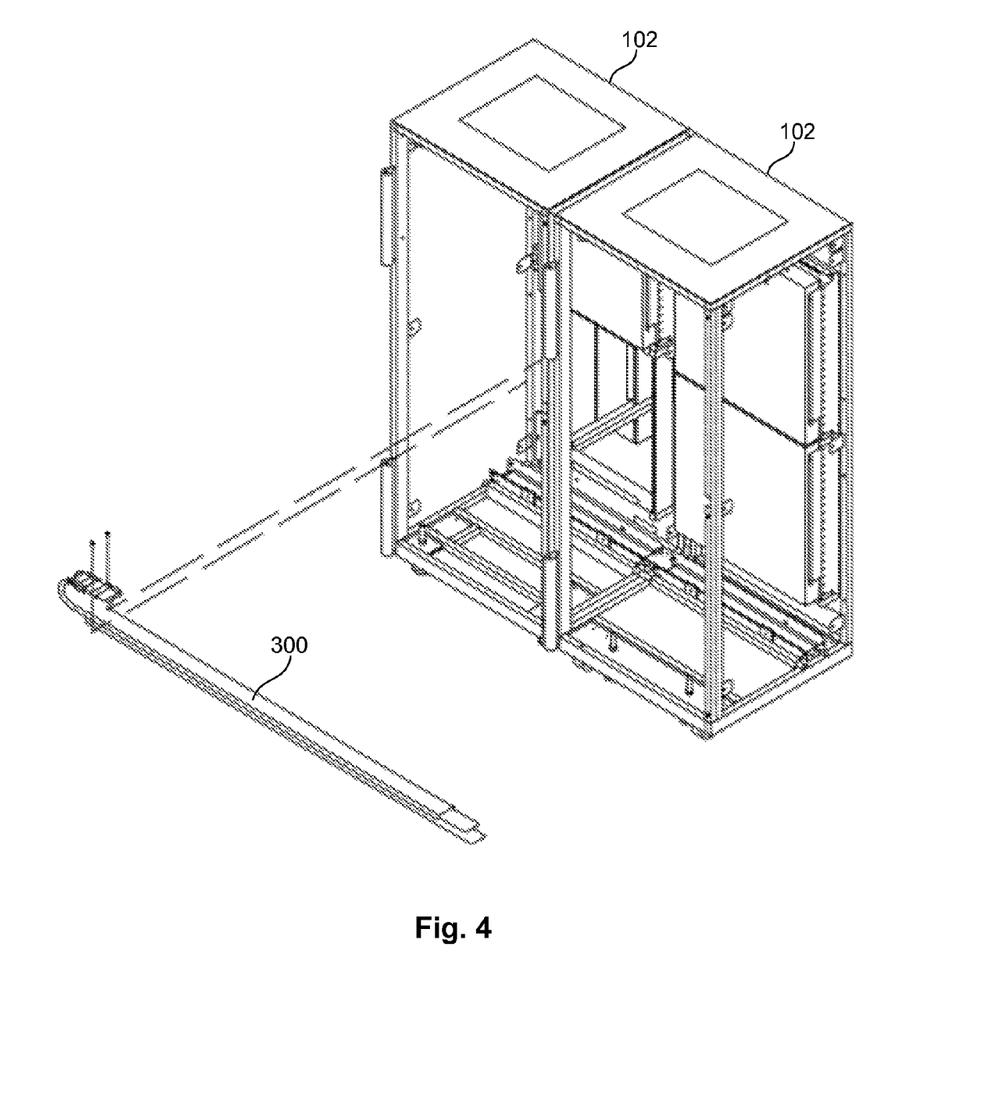
FIG. 4 is a perspective view of one embodiment of a high flex-life electrical cable assembly in relation to several tape library frames.

Referring to FIG. 3, a perspective view of one embodiment of an accessor 204 is illustrated. This accessor 204 may include motors, controller cards, and/or other electronics that require power and the ability to communicate with a stationary library controller (not shown). To transmit electrical power and data signals between the stationary library controller and the accessor 204, a flexible cable assembly 300 in accordance with the invention may be connected to the accessor 204. This flexible cable assembly 300 provides high-bandwidth signal capability and high noise immunity. The flexible cable assembly 300 also has a very high flex-life as will be explained in more detail hereafter. One embodiment of a flexible cable assembly 300 in relation to several frames 102 is shown in FIG. 4. Depending on the number of frames 102 in the tape library 100, the flexible cable assembly 300 may be up to fifty feet long to accommodate the distance travelled by the accessor 204, although it is not limited to any particular length.

Figure 5:
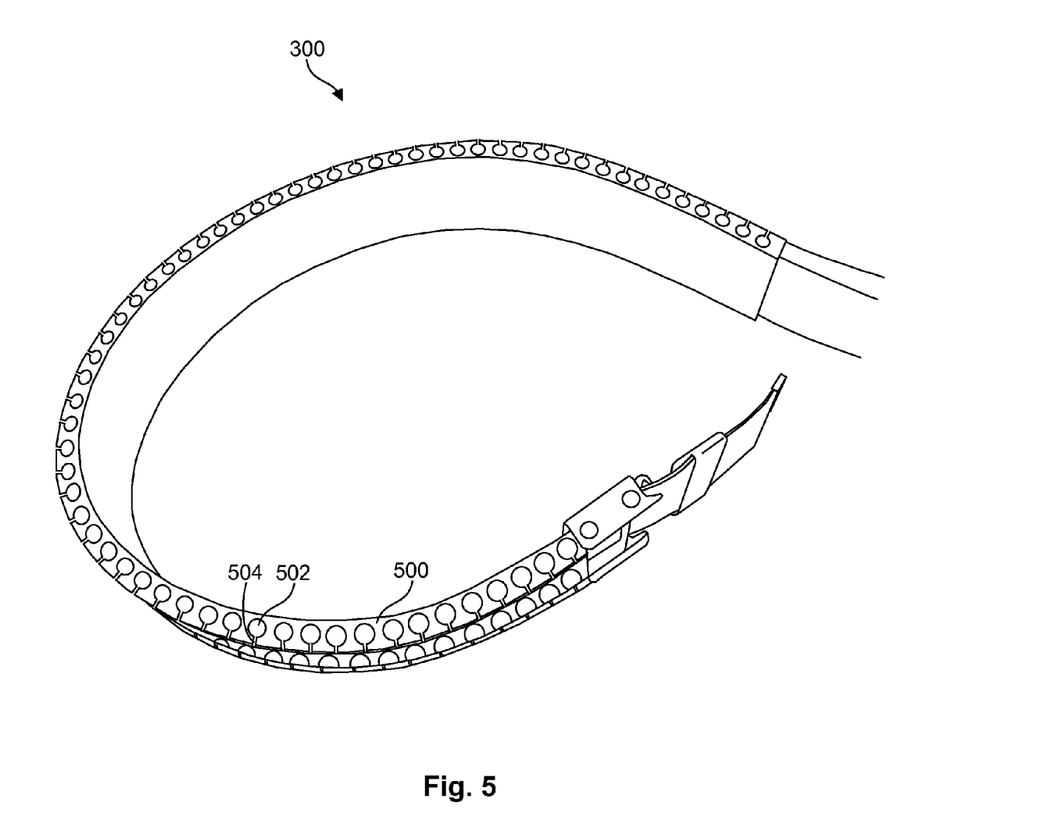
FIG. 5 is a perspective view of one embodiment of an electrical cable assembly in accordance with the invention.
Figure 6:
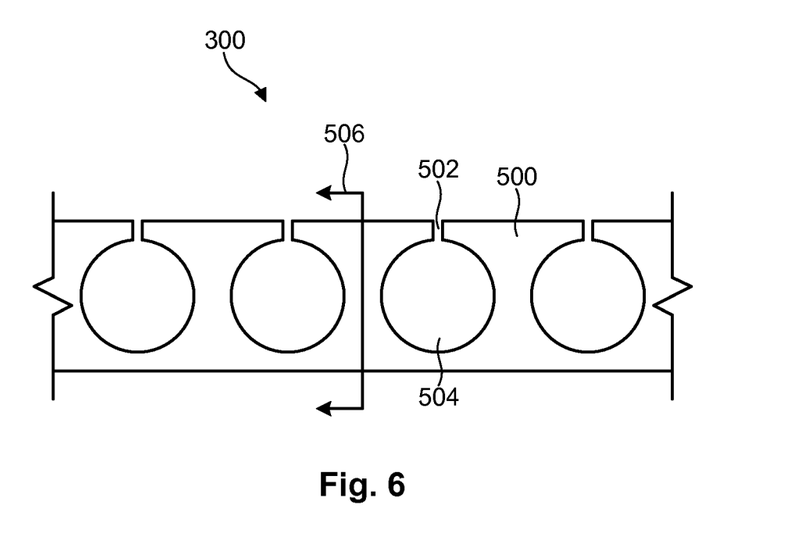
FIG. 6 is a cutaway side view of one embodiment of an electrical cable assembly in accordance with the invention.

Referring to FIG. 5, a perspective view of one embodiment of a flexible cable assembly 300 in accordance with the invention is illustrated. As shown, the flexible cable assembly 300 may include an open flexible track 500 having one or more wires passing therethrough. The track 500 may be made of a flexible material, such as a flexible plastic, and include a retention membrane (not shown) to enclose and retain the wires within the flexible track 500. The instant inventors have found that polypropylene works well for the track 500 and exhibits a suitable flex-life. In certain embodiments, one or more apertures 502 and/or slits 504 may be formed in the track 500 to impart additional flexibility thereto. These apertures 502 and/or slits 504 may be formed in the sides of the track 500 to facilitate bending in the plane of the sides. In certain embodiments, the track 500 is manufactured using an extrusion process and the apertures 502 and/or slits 504 are then cut or machined into the extruded track 500. FIG. 6 shows a cutaway side view of the flexible cable assembly 300 of FIG. 5.

Figure 7:
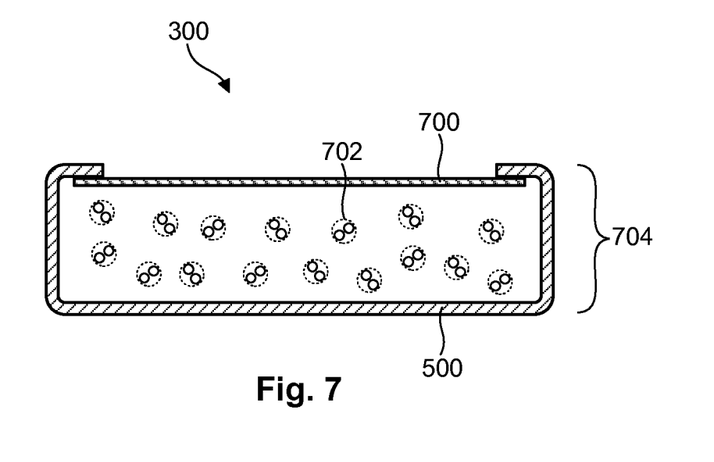
FIG. 7 is a cross-sectional view of an electrical cable assembly containing multiple twisted wire pairs.

Referring to FIG. 7, a cross-sectional view of one possible embodiment of the flexible cable assembly 300 along the section line 506 of FIG. 6 is illustrated. As shown, the flexible cable assembly 300 includes an open track 500 to accommodate one or more wires. A retention membrane 700 (such as a 5 mil thick strip of clear polyester) may be inserted into the track 500 to enclose and retain the wires. The track 500 and retention membrane 700 together may form a channel 704. As shown, one or more twisted wire pairs 702 (e.g., 1 to 100 pairs of 28 AWG or other suitable gauge twisted wire pairs) may be routed through the channel 704. These twisted wire pairs 702 (which may be used to carry communication signals and/or electrical power) may be allowed to independently and freely move within the channel 704. That is, the twisted pairs 702 are "loose" and not bonded or substantially constrained by other wires in the channel 704 or by the channel 704 itself.

The independent and free movement allows stresses in the twisted wire pairs 702 to be relieved as bending occurs by allowing the twisted pairs 702 to move freely within the channel 704. The instant inventors have found that the independent and free movement of the twisted wire pairs 702 within the channel 704 significantly improves the flex life of the wire 702. Furthermore, the twisted wire pairs 702 (when used to transmit communication signals) support much higher bandwidth and provide much higher noise immunity than flat parallel conductors or other conventional types of wire. The twisted pairs 702 also offer advantages in terms of noise immunity, bandwidth, and security compared to prior art solutions that use moving contacts that slide on fixed conductors, or use non-contact means such as inductive coupling or wireless communication to transmit power and electrical signals.

Figure 8:
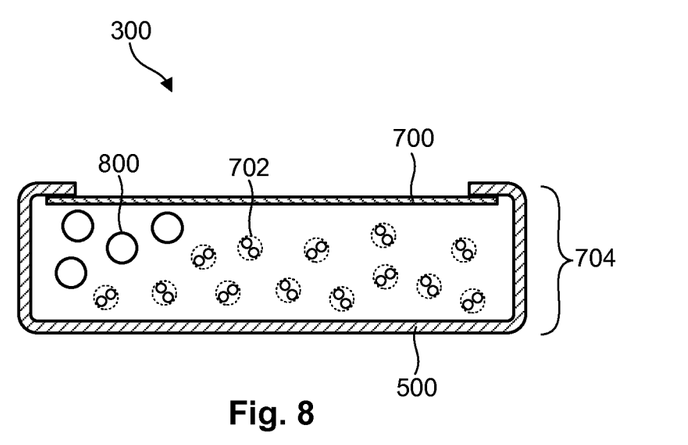
FIG. 8 is a cross-sectional view of one embodiment of an electrical cable assembly containing multiple twisted wire pairs and power cables.

Referring to FIG. 8, a cross-sectional view of another embodiment of a flexible cable assembly 300 along the section line 506 of FIG. 6 is illustrated. In this embodiment, one or more power cables 800 (e.g., 16 gauge or other suitable gauge power cables) are routed through the channel 704 with the twisted wire pairs 702. In this embodiment, the power cables 800 are intermingled with the twisted pairs 702. Like the twisted pairs 702, the power cables 800 are allowed to independently and freely move within the channel 704 as the flexible cable assembly 300 flexes and bends. This allows stresses in the power cables 800 to be relieved as the cables flex and bend within the channel 704. In certain embodiments, the strand count in the power cables 800 and/or twisted wire pairs 702 is increased to further improve the flex life of the cables 800, 702. The instant inventors have found that wires (i.e., twisted pairs 702 and power cables 800) insulated with polyolefins are excellent for use with the flexible cable assembly 300 since polyolefins exhibit excellent flex-life and are free of halogens.

Figure 9:
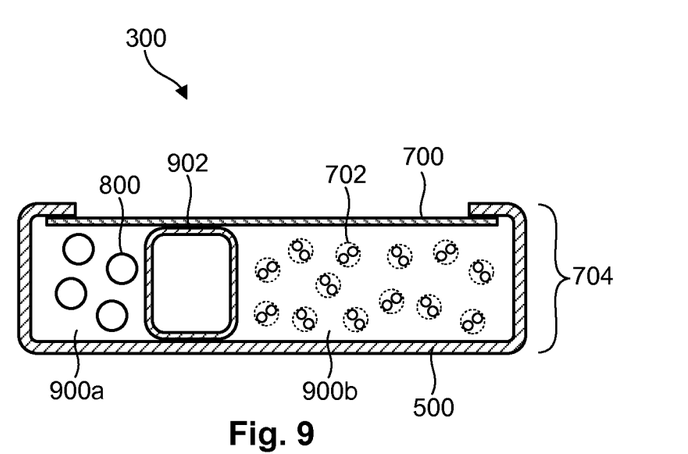
FIG. 9 is a cross-sectional view of an electrical cable assembly containing multiple twisted wire pairs and power cables separated by a partition element.

Referring to FIG. 9, a cross-sectional view of yet another embodiment of a flexible cable assembly 300 along the section line 506 of FIG. 6 is illustrated. As shown, one or more power cables 800 are routed through the channel 704 with the twisted wire pairs 702. However, in this embodiment, the power cables 800 are physically isolated from the twisted pairs 702. Both the twisted pairs 702 and power cables 800 may be allowed to independently and freely move within separate sub-channels 900a, 900b formed in the flexible channel 704. In certain embodiments, the sub-channels 900a, 900b may be created by a partition element 902 positioned in the channel 704. In certain embodiments, apertures and/or slits (not shown) may be formed in the partition element 902 to make it more flexible. In certain embodiments, the partition element 902 is made of polypropylene, although other suitable materials may also be used. Allowing the cables 702, 800 to independently and freely move inside the sub-channels 900a, 900b allows stresses in both the twisted pairs 702 and the power cables 800 to be relieved as bending occurs (thereby increasing flex life), but keeps the twisted pairs 702 and power cables 800 isolated from one another to prevent physical and/or electromagnetic interference between the two.

Figure 10:
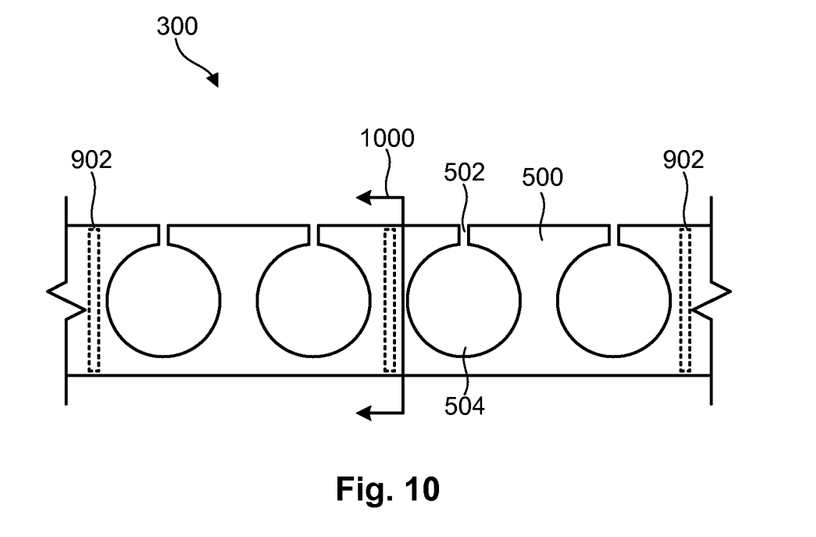
FIG. 10 is a cutaway side view of an electrical cable assembly having another type of partition element.
Figure 11:
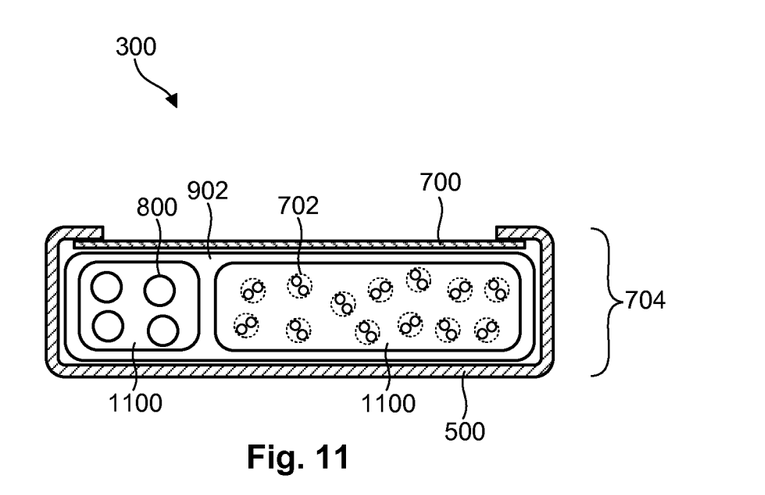
FIG. 11 is a cross-sectional view of the electrical cable assembly of FIG. 10 showing the partition element.

Referring to FIGS. 10 and 11, another embodiment of a partition element 902 is illustrated. FIG. 10 shows a cutaway side view of an electrical cable assembly 300 with the partition element(s) 902 indicated by the dotted lines. FIG. 11 is a cross-section of the flexible cable assembly 300 (along the section line 1000) showing a partition element 902. As shown in FIG. 10 partition elements 902 may be placed at selected intervals along the flexible channel 704. These partition elements 902 may include one or more apertures 1100, as shown in FIG. 11. The power cables 800 and twisted pairs 702 may be routed through the apertures 1100 to keep the power cables 800 and twisted pairs 702 isolated from one another. In selected embodiments, the spacing of the partition elements 902 may be maintained by attaching them to the inside surface of the flexible channel 704 or tying them to the cables 702, 800.

Figure 12:
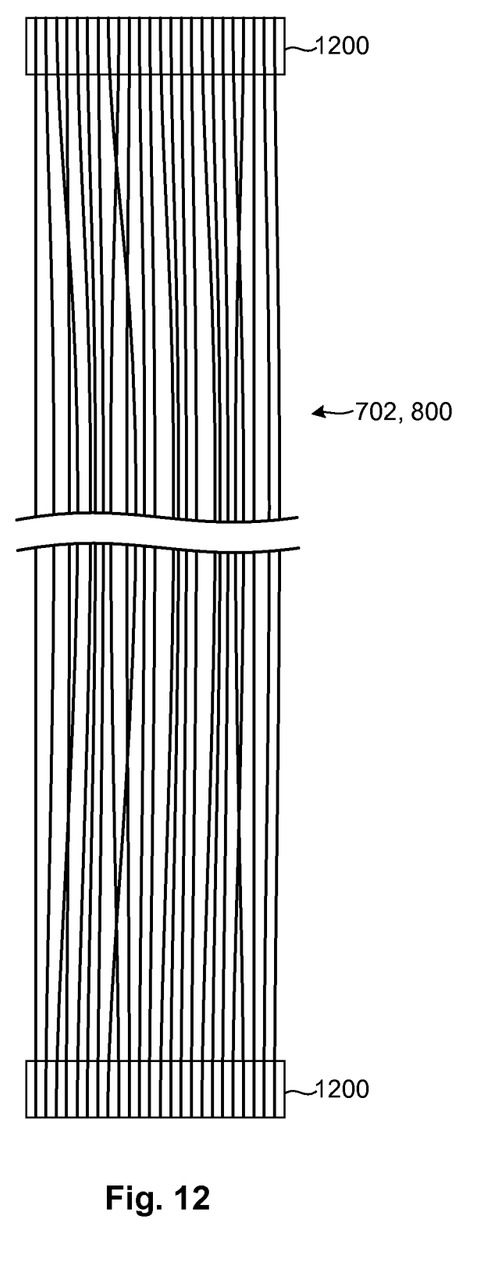
FIG. 12 shows various twisted wire pairs and/or power cables having their ends laminated to enable connectors to be attached thereto.

Referring to FIG. 12, as previously mentioned one or more twisted wire pairs 702 or cables 800 may be loosely routed through the flexible channel 704. This allows the wires to freely move or wander within the channel 704 as the flexible cable assembly 300 flexes. In selected embodiments in accordance with the invention, a laminating material 1200 such as plastic may be placed on the ends of the loose wires 702, 800 to hold the ends in place. The laminating material 1200 may allow various types of connectors (such as insulation displacement connectors or crimp and poke connectors) to be more easily attached to the ends of the wires. Once the connectors are attached, the laminating material 1200 may be removed or left in place.

The instant inventors have found that the flexible cable assembly 300 described in FIGS. 5 through 12 exhibits a flex life of greater than one million flex cycles, and in some cases greater than five million flex cycles. This exceeds the desired flex life for many tape library applications. Nevertheless, it should be recognized that the flexible cable assembly 300 is not limited to tape library applications but may be equally useful in other applications. That is, the flexible cable assembly 300 may be used to transmit communication signals and/or electrical power to other types of moving machines.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   an accessor to physically transport tape cartridges in a tape library; and
   a flexible cable assembly connected to the accessor to enable the accessor to move relative to the tape library, the flexible cable assembly comprising:
      a flexible channel;
      a plurality of twisted wire pairs loosely routed together through the flexible channel, the plurality of twisted pairs independently and substantially freely moving within the flexible channel; and
      the flexible channel lacking internal projections to prevent intermingling of selected twisted wire pairs with other twisted wire pairs.

2. The apparatus of claim 1, wherein the flexible channel comprises a flexible track and a retention membrane to substantially enclose the flexible track.

3. The apparatus of claim 2, wherein at least one of the flexible track and the retention membrane are fabricated from plastic.

4. The apparatus of claim 2, further comprising at least one of slits and apertures in the flexible track to impart flexibility thereto.

5. The apparatus of claim 1, wherein the plurality of twisted wire pairs are configured to transport at least one of communication signals and electrical power.

6. The apparatus of claim 1, further comprising at least one power cable routed through the flexible channel with the plurality of twisted wire pairs.

7. The apparatus of claim 6, wherein the plurality of twisted wire pairs and the at least one power cable are substantially isolated within the flexible channel.

8. The apparatus of claim 7, further comprising a partition element in the flexible track to isolate the plurality of twisted wire pairs from the at least one power cable.

9. The apparatus of claim 1, wherein the ends of the plurality of twisted wire pairs are substantially fixed relative to one another to enable connectors to be attached thereto.

10. The apparatus of claim 9, wherein the ends of the plurality of twisted wire pairs are laminated to enable connectors to be attached thereto.

* * * * *